United States Patent
Pantus et al.

(10) Patent No.: US 9,730,074 B2
(45) Date of Patent: Aug. 8, 2017

(54) SYSTEM, METHODS AND APPARATUSES FOR PROVIDING NETWORK ACCESS SECURITY CONTROL

(71) Applicant: TELEFONAKTIEBOLAGET LM ERICSSON (PUBL), Stockholm (SE)

(72) Inventors: Alexander Pantus, Solna (SE); Annikki Welin, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/112,022

(22) PCT Filed: Jan. 16, 2014

(86) PCT No.: PCT/SE2014/050041
§ 371 (c)(1),
(2) Date: Jul. 15, 2016

(87) PCT Pub. No.: WO2015/108453
PCT Pub. Date: Jul. 23, 2015

(65) Prior Publication Data
US 2016/0337859 A1 Nov. 17, 2016

(51) Int. Cl.
*H04M 1/66* (2006.01)
*H04W 12/08* (2009.01)
(Continued)

(52) U.S. Cl.
CPC ........... *H04W 12/08* (2013.01); *H04L 61/157* (2013.01); *H04L 63/0236* (2013.01);
(Continued)

(58) Field of Classification Search
CPC .... G06Q 10/00; G06Q 20/4016; G06Q 20/00; G06Q 20/40; H04L 9/32; H04L 63/08;
(Continued)

(56) References Cited

U.S. PATENT DOCUMENTS 7,281,137 B1 * 10/2007 Vitikainen ............. H04L 63/08
380/250
9,220,120 B2 * 12/2015 Wang ................. H04W 76/022
(Continued)

FOREIGN PATENT DOCUMENTS

WO 0103402 A1 1/2001
WO 2012168714 A1 12/2012

OTHER PUBLICATIONS

Sangli, et al., BGP Extended Communities Attribute, RFC 4360, Feb. 2006.
(Continued)

*Primary Examiner* — Mahendra Patel

(57) ABSTRACT

A method in a system for providing information about an association between an IP address of a UE and an ICCID of a SIM card used in the UE in a first security domain to an entity in a second security domain. The system comprises a MME, an HSS and a PDN-GW. The method comprises the MME retrieving at least the ICCID and optionally an IP address for the UE from the HSS, and sending the ICCID and optionally the IP address towards the PDN-GW. The method comprises the HSS receiving a request from the MME, and sending the ICCID and optionally the IP address to the MME. Still further, the method comprises the PDN-GW receiving the ICCID and optionally the IP address, if no IP address is received then the PDN-GW assigning an IP address, associating the IP address with the ICCID and informing the entity in the second security domain about the association between the IP address and ICCID in the first security domain.

10 Claims, 8 Drawing Sheets

(51) Int. Cl.
*H04L 29/06* (2006.01)
*H04W 12/06* (2009.01)
*H04L 29/12* (2006.01)

(52) U.S. Cl.
CPC ......... *H04L 63/0853* (2013.01); *H04W 12/06* (2013.01); *H04L 61/10* (2013.01); *H04L 61/2007* (2013.01)

(58) Field of Classification Search
CPC ............... H04L 63/0884; H04L 61/157; H04L 63/0236; H04L 63/0853; H04L 61/10; H04L 61/2007; H04W 12/06; H04W 8/26; H04W 76/022; H04W 36/0022; H04W 36/0016; H04W 36/0033; H04W 8/082; H04W 12/08
USPC ..... 455/411, 410, 436, 435.1; 380/218, 213; 370/254, 466, 401
See application file for complete search history.

(56) References Cited

U.S. PATENT DOCUMENTS

| | | | | |
|---|---|---|---|---|
| 2009/0275309 | A1* | 11/2009 | He | H04W 36/0038 455/410 |
| 2009/0298500 | A1* | 12/2009 | Beckmann | H04L 29/12188 455/435.1 |
| 2010/0035578 | A1* | 2/2010 | Ahmed | H04W 12/06 455/411 |
| 2010/0085914 | A1* | 4/2010 | Kunniyur | H04L 65/1016 370/328 |
| 2011/0170517 | A1* | 7/2011 | Bakker | H04W 36/0033 370/331 |
| 2013/0195268 | A1* | 8/2013 | Norrman | H04W 12/04 380/247 |
| 2014/0172712 | A1* | 6/2014 | Petersen | G06Q 10/00 705/44 |
| 2015/0358813 | A1* | 12/2015 | Lee | H04W 12/04 380/279 |

OTHER PUBLICATIONS

3GPP TR 23.888 V11.0.0 3rd Generation Partnership Project; Technical Specification Group Services and System Aspects; System improvements for Machine-Type Communications (MTC) (Release 11), Sep. 2012.

Braine, Deep Dive into TrustSec/Demo, Cisco, CCIE R/S: 24663, 2011.

Cisco TrustSec Security Group Access Solution Configuration Guide, Version 1.5, Cisco Systems, Inc., Jul. 2010.

* cited by examiner

SYSTEM, METHODS AND APPARATUSES FOR PROVIDING NETWORK ACCESS SECURITY CONTROL

This application is a 371 of International Application No. PCT/SE2014/050041, filed Jan. 16, 2014, the disclosure of which is fully incorporated herein by reference.

TECHNICAL FIELD

The present disclosure relates to access control and in particular to access security control.

BACKGROUND

The number of users of mobile communication devices is constantly increasing. Communication is further becoming more and more global, which means that two devices communication often belong to different communication networks or security domains. Still further, many users further have a plurality of mobile communication devices, plus high mobility requires secure identification for traffic originator, especially when traffic takes place between different communication networks or security domains.

One example of how to implement a network access security is to define security policies based on source and destination Internet Protocol, IP, address. This may be done by access-control list, ACL, applied on network interface. However such approach would require knowledge of a particular IP address assigned to a particular device at a certain moment of time, especially if a primary network access to such device is provided by other authority domain.

Application of various VPN techniques (with or without encryption), when some kind of a tunnel is created and device is assigned with a pre-defined IP address would solve this problem with help of an overlay authentication mechanism.

Another possible solution is to create a domain where all traffic inside the domain is marked with a special security group tag, SGT, on Media Access Control, MAC, layer. Each SGT is related to a certain role/identity so network administrators may build their policies using traffic identification based on SGT rather than on some abstract IP address.

One of the most challenging problems in managing large networks is the complexity of security administration. Remote access to cloud content creates big burden for the firewall administrators, since IP-addresses are not possible to aggregate and all the addresses must be mapped manually and often with policy based rules towards the content.

A VPN tunnelling always comes with extra cost of transport overhead and increased complexity, which is not needed in case when only simple identification of origin is needed and neither confidentiality nor integrity protection is required.

In existing solutions, where a domain is created, proprietary support for that solution on all network nodes is required and is not possible to implement across several authority domains or autonomous systems.

Further, the dynamic nature of assignment of IP addresses to mobile devices renders the existing practice of building security policies based on IP address association rigid and ineffective plus adds a heavy burden of frequent administrative activities.

SUMMARY

The object is to obviate at least some of the problems outlined above. In particular, it is an object to provide a system and a method performed by the system for providing information about an association between an IP address of a User Equipment, UE, and an Integrated Circuit Card Identifier, ICCID of a Subscriber Identity Module, SIM, card used in the UE in a first security domain to an entity in a second security domain. A further object is to provide a Mobility Management Entity, MME, and a method performed by the MME for network access security control for a UE, wherein the MME and UE operates in a first security domain. Still further, it is an object to provide a Packet Data Network Gateway, PDN-GW, and a method performed by the PDN-GW in a first security domain for providing information about an association between an IP address assigned to a UE and an ICCID of a SIM card used by the UE, in the first security domain to an entity in a second security domain. It is also an object to provide a Home Subscriber Server, HSS, and a method performed by the HSS in a first security domain for enabling association between a particular subscriber identity behind a UE and an IP address assigned to the UE, in a first security domain provided to an entity in a second security domain. These objects and others may be obtained by providing a system, MME, PDN-GW, HSS and a respective method performed by a system, MME, PDN-GW, HSS according to the independent claims attached below.

According to an aspect, a method performed by a system for providing information about an association between an IP address of a UE and an ICCID of a SIM card used in the UE in a first security domain to an entity in a second security domain is provided. The system comprises a MME, an HSS and a PDN-GW. The method comprises the MME retrieving at least the ICCID of the SIM card used by the UE and optionally an IP address for the UE from the HSS, and sending the ICCID and optionally the IP address towards the Packet Data Network Gateway, PDN-GW. The method further comprises the HSS receiving a request for the ICCID and optionally for the IP address from the MME, and sending the ICCID and optionally the IP address to the MME. Still further, the method comprises the PDN-GW receiving the ICCID for the SIM card used by UE and optionally the IP address for the UE, if no IP address is received then the PDN-GW assigning an IP address for the UE, associating the IP address with the ICCID and informing the entity in the second security domain about the association between the IP address assigned to the UE and ICCID of the SIM card used by the UE in the first security domain.

According to an aspect, a method performed by an MME for network access security control for a UE, the MME and UE operating in a first security domain is provided. The method comprises retrieving an ICCID and optionally an IP address for the UE from a HSS; and sending the ICCID and optionally the IP address towards a PDN-GW.

According to an aspect, a method performed by a PDN-GW in a first security domain for providing information about an association between an IP address assigned to a UE and an ICCID of a SIM card used by the UE, in the first security domain to an entity in a second security domain is provided. The method comprises receiving, from a MME, the ICCID and optionally an IP address for the UE. If no IP address for the UE was received, then assigning an IP address for the UE. The method further comprises associating the IP address with the ICCID; and informing the entity in the second security domain about the association between the IP address assigned to the UE and the ICCID of the SIM card used by the UE in the first security domain.

According to an aspect, a method performed by a HSS in a first security domain for enabling association between a particular subscriber identity behind a UE and an IP address assigned to the UE, in a first security domain provided to an entity in a second security domain is provided. The method comprises receiving a request for an ICCID of a SIM card used in the UE and optionally an IP address for the UE and from a MME; and sending the ICCID and optionally the IP address to the MME.

According to an aspect, a system for providing information about an association between an IP address assigned to a UE and an ICCID of a SIM card used in the UE in a first security domain to an entity in a second security domain is provided. The system comprises a MME, a HSS and a PDN-GW. In the system the MME is adapted for retrieving at least the ICCID of the SIM card used by the UE and optionally an IP address for the UE from the HSS, and for sending the ICCID and optionally the IP address towards the PDN-GW. Further, the HSS is adapted for receiving a request for the ICCID and optionally for the IP address from the MME, and for sending the ICCID and optionally the IP address to the MME. Still further, the PDN-GW is adapted for receiving the ICCID for the SIM card used by UE and optionally the IP address for the UE, if no IP address is received then the PDN-GW is adapted for assigning an IP address for the UE, associating the assigned IP address with the ICCID and informing the entity in the second security domain about the association between the IP address assigned to the UE and ICCID of the SIM card used by the UE in the first security domain.

According to an aspect, a MME adapted for network access security control for a UE, the MME and UE operating in a first security domain is provided. The MME comprises a processor and a memory, the memory comprises instructions which when executed by the processor causes the MME to retrieve an ICCID and optionally an IP address for the UE from a HSS; and to send the ICCID and optionally the IP address towards a PDN-GW.

According to an aspect, a PDN-GW in a first security domain adapted for providing information about an association between an IP address assigned to a UE and an ICCID of a SIM card used by the UE, in the first security domain to an entity in a second security domain is provided. The PDN-GW comprises a processor and a memory, the memory comprises instructions which when executed by the processor causes the PDN-GW to receive, from a MME, the ICCID and optionally an IP address for the UE; and if no IP address for the UE was received, then to assign an IP address for the UE. The instructions in the memory when executed by the processor further causes the PDN-GW to associate the IP address to the ICCID; and to inform the entity in the second security domain about the association between the IP address assigned to the UE and the ICCID of the SIM card used by the UE in the first security domain.

According to an aspect, a HSS in a first security domain adapted for enabling association between a particular subscriber identity behind a UE and an IP address assigned to the UE, in a first security domain provided to an entity in a second security domain is provided. The HSS comprises a processor and a memory, the memory comprises instructions which when executed by the processor causes the HSS to receive a request for an ICCID and optionally an IP address and from a MME; and to send the ICCID and optionally the IP address to the MME.

The system, MME, PDN-GW and HSS, as well as the respective method performed by the system, MME, PDN-GW and HSS, have the same possible advantages. The MME, PDN-GW and HSS may all contribute and enable the system to obtain the possible advantages. Thus, they provide a solution for identification of traffic source by using a secure association between the actual person who possess the mobile device that is the traffic source and IP address that traffic is originated from may be provided. The above system and arrangements as well as the respective method performed thereby may enable, or contributing to, eliminating the necessity for the overlay security mechanism such as VPN which creates unnecessary transport overhead in the network when no confidentiality and integrity protection is required for the traffic in question.

BRIEF DESCRIPTION OF DRAWINGS

Embodiments will now be described in more detail in relation to the accompanying drawings, in which.

DETAILED DESCRIPTION

Briefly described, a system and various devices and/or entities as well as method performed thereby are provided for providing information about an association between an IP address assigned to a UE and an ICCID of a SIM card used in the UE in a first security domain to an entity in a second security domain for enabling communication between the UE and the entity in a second security domain. An MME and a method performed by the MME for network access security control for a UE, the MME and UE operating in a first security domain are provided. A PDN-GW in a first security domain and a method performed by the PDN-GW for providing information about an association between an IP address assigned to a UE and an ICCID of a SIM card used by the UE, in the first security domain to an entity in a second security domain are provided. Further, an HSS in a first security domain and a method performed by the HSS for enabling association between a particular subscriber identity behind a UE and an IP address assigned to the UE, in a first security domain provided to an entity in a second security domain are provided.

3rd Generation Partnership Project, 3GPP, standard uses a strong authentication mechanism for network access control implemented with help of Universal Integrated Circuit Card, UICC-based Universal Subscriber Identity Module, USIM, application. A subscriber may be identified in 3GPP networks by various identities (e.g. Universal Subscriber Identity Module, IMSI, Temporary Mobile Subscriber Identity, T-MSI, Mobile Subscriber Integrated Services Digital Network Number, MSISDN) however most of them are considered as internal and cannot be shared outside the authority domain of mobile network for security reasons. On other hand, the unique Integrated Circuit Card Identifier, ICCID, identifies each USIM and often is physically printed on SIM card, i.e. is available outside the mobile operator security domain. So ICCID may be used as a tag across a security domain boundaries that unambiguous associate particular device with its present owner.

Association between ICCID and IP address may be further propagated inside the routing domain and across autonomous system boundaries by a routing protocol, e.g. Border Gateway Protocol. The ICCID value may be conveyed using BGP extended community attribute assigned to the prefix announces where prefix represents an IP address currently assigned to UE by PDN-GW.

Such identification of traffic source is possible by using a secure association between the actual person who possess the mobile device that is the traffic source and IP address that traffic is originated from. It eliminates necessity for the overlay security mechanism such as Virtual Private Network, VPN, which creates unnecessary transport overhead in the network when no confidentiality and integrity protection is required for the user payload.

Figure 1A:
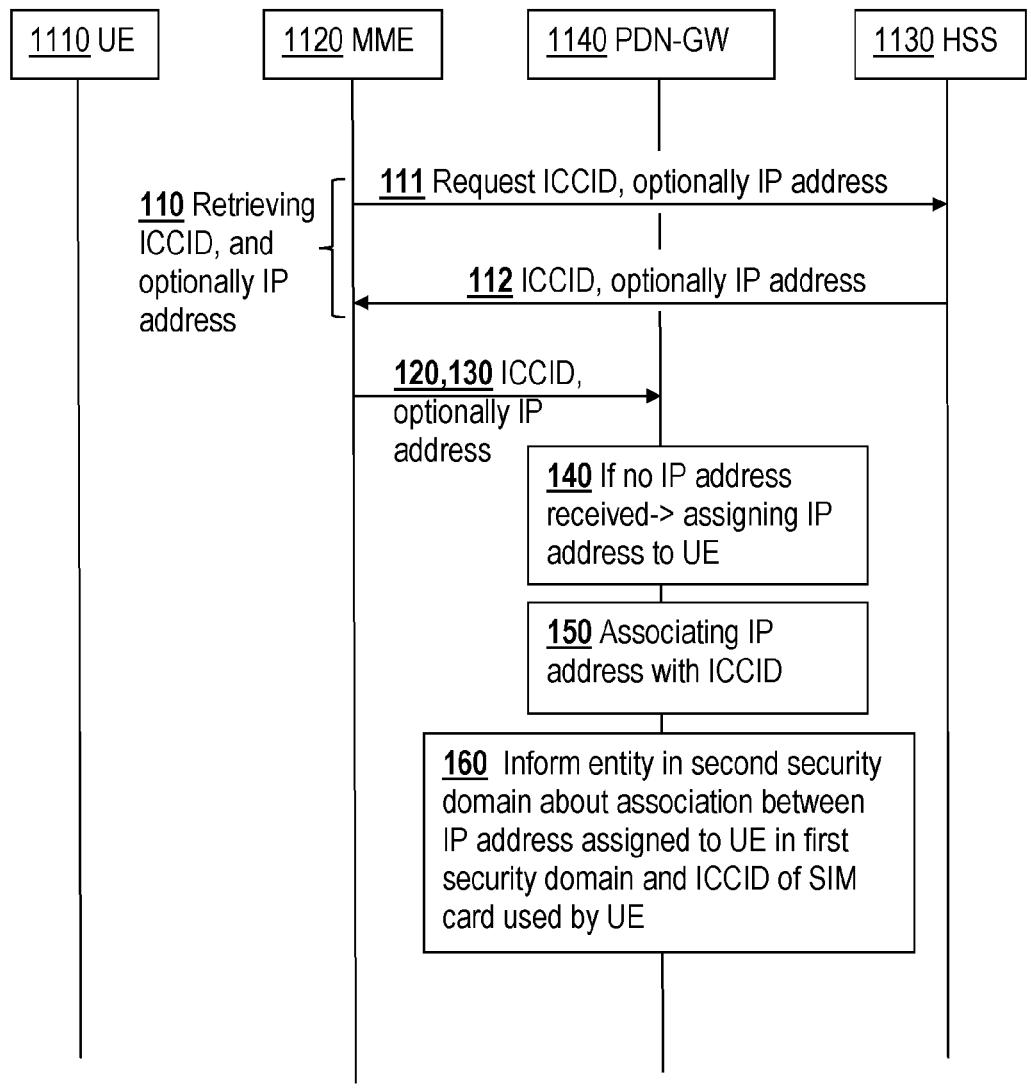
FIG. 1a is a signalling diagram of a method performed by a system for providing information about an association between an IP address of a User Equipment, UE, and an Integrated Circuit Card Identifier, ICCID, of a Subscriber Identity Module, SIM, card used in the UE to another security domain according to an exemplifying embodiment.

FIG. 1a is a signalling diagram of a method performed by a system for providing information about an association between an IP address of a UE and an ICCID of a SIM card used in the UE in a first security domain to an entity in a second security domain according to an exemplifying embodiment. The system comprises a MME, an HSS and a PDN-GW.

In FIG. 1a, the different entities and/or devices and/or nodes are denoted as follows: UE 1110, MME 1120, HSS 1130 and PDN-GW 1140.

FIG. 1a illustrates the method comprising the MME 1120 retrieving 110 at least the ICCID of the SIM card used by the UE and optionally an IP address for the UE from the HSS 1130, and sending 120 the ICCID and optionally the IP address towards the Packet Data Network Gateway, PDN-GW.

The method further comprises the HSS 1130 receiving 111 a request for the ICCID and optionally for the IP address from the MME, and sending 112 the ICCID and optionally the IP address to the MME. Still further, the method comprises the PDN-GW 1140 receiving 130 the ICCID for the SIM card used by UE and optionally the IP address for the UE, if no IP address is received then the PDN-GW assigning 140 an IP address for the UE, associating 150 the IP address with the ICCID and informing 160 the entity in the second security domain about the association between the IP address assigned to the UE and ICCID of the SIM card used by the UE in the first security domain.

As stated above, the system comprises a plurality of nodes and/or entities, e.g. the MME 1120, the HSS 1130 and the PDN-GW 1140. The different nodes and/or devices have different functions to fulfil in order for allowing the UE to communicate within and outside the first security domain and in order for allowing the UE to move around within and outside the first security domain.

The MME is a term used by a node in the 3GPP LTE and GPRS standards. Although this term is used to in this disclosure, the technical solution presented herein is not limited to the 3GPP LTE and GPRS standards, but are merely examples in order to illustrate and explain the technical solution.

The MME is a control node in e.g. an LTE network. The MME is responsible for idle mode UE tracking and paging procedure including retransmissions. The MME is involved in bearer activation/deactivation process and is also responsible for choosing a serving gateway, SGW, for a UE at an initial attach procedure and at time of intra-LTE handover involving Core Network, CN, node relocation and/or reselection. The MME is further responsible for authenticating the user by interacting with the HSS. The MME is also responsible for generation and allocation of temporary identities to UEs. The MME checks the authorisation of the UE to camp on a service provider's Public Land Mobile Network, PLMN, and enforces UE roaming restrictions. The MME is the termination point in the network for ciphering/integrity protection for Non-Access Stratum, NAS, signalling and handles security key management.

The PDN-GW provides connectivity from the UE to external packet data networks and/or security domains by being the point of exit and entry of traffic for the UE. A UE may have simultaneous connectivity with more than one PDN-GW for accessing multiple PDNs. The PGW performs policy enforcement, packet filtering for each user, charging support, packet screening. Another key role of the PGW is to act as the anchor for mobility between 3GPP and non-3GPP technologies.

The HSS is a database that comprises user-related and subscription-related information. The functions of the HSS include functionalities such as mobility management, call and session establishment support, user authentication and access authorisation.

The MME 1120 retrieves 110 at least the ICCID of the SIM card used by the UE and optionally an IP address for the UE from the HSS 1130. The UE may be associated with a static IP address, which may then be stored in the HSS, but it is not compulsory. The MME thus retrieves at least the ICCID of the SIM card used by the UE. This may be done by the MME 1120 sending a request for the ICCID to the HSS 1130. As an option, the MME may also request the IP address for the UE, either by sending a separate request to the HSS or by means of the request for the ICCID. Once the MME 1120 retrieves the ICCID and optionally the IP address, the MME 1120 sends 120 the ICCID and optionally also the IP address to the PDN-GW 1140. It shall be pointed out that the MME may request the IP address for the UE from the HSS and only receive it from the HSS if the HSS has the IP address for the UE. Thus, even if the MME requests both the ICCID and the IP address, the MME may only manage to retrieve the ICCID.

The HSS 1130 receives 111 the request for the ICCID of the SIM card used by the UE 1110 and sends 112 the ICCID to the MME 1120. The HSS 1130 may optionally receive a separate request for the IP address for the UE, or the request for the ICCID may also comprise a request for the IP address. If the HSS 1130 receives a request for the IP address of the UE, the HSS may send the IP address to the MME 1120 only if the HSS has the IP address of the UE 1110.

Once the MME 1120 has sent 120 at least the ICCID of the SIM card used by the UE 1110 to the PDN-GW 1140, the PDN-GW receives 130 the ICCID, and optionally also the IP address. If the PDN-GW 1140 only receives the ICC ID and not the IP address, the PDN-GW assigns 140 an IP address to the UE and then associates 150 the IP address with the ICCID. By associating the IP address with the ICCID, the ICCID may henceforth be used for the identification of UE instead of the IP address both within the first security domain and outside the first security domain. Thus a user may have a plurality of different devices having the same ICCID but different IP addresses. However, since the ICCID is used instead of the IP addresses, an identification of traffic source by using a secure association between the actual person who possess the mobile device that is the traffic source and IP address that traffic is originated from may be obtained.

The PDN-GW then informs 160 the entity in the second security domain about the association between the IP address assigned to the UE and ICCID of the SIM card used by the UE in the first security domain.

Figure 1B:
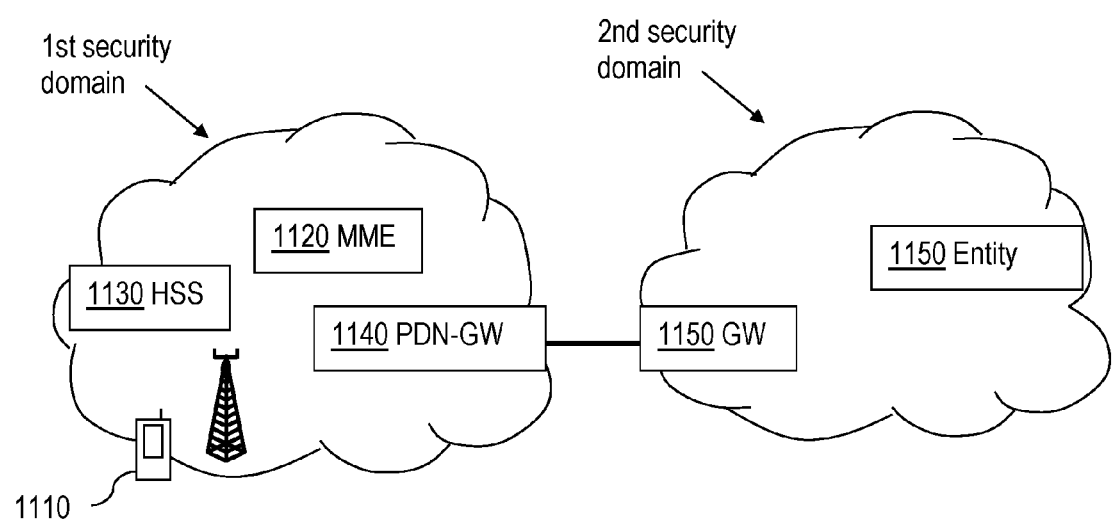
FIG. 1b is a schematic illustration of a first and a second security domain, wherein the UE in the first security domain and the entity in the second security domain may communicate.

FIG. 1*b* is a schematic illustration of a first and a second security domain, wherein the UE in the first security domain and the entity in the second security domain may communicate. In FIG. 1*b*, the UE 1110, the MME 1120, the HSS 1130 and the PDN-GW 1140 are illustrated in the first security domain to the left in the figure. The second security domain is illustrated to the right in the figure and is illustrating comprising a gateway, GW, 1150 and the entity 1160. It shall be pointed out that both the first and the second security domains are schematically illustrated and they both may comprise more and/or other devices and/or nodes than those illustrated in FIG. 1*b*.

The method performed by the system may have several possible advantages. One possible advantage is that a solution for identification of traffic source by using a secure association between the actual person who possess the mobile device that is the traffic source and IP address that traffic is originated from may be provided. The method may eliminate the necessity for the overlay security mechanism such as VPN which creates unnecessary transport overhead in the network when no confidentiality and integrity protection is required for the traffic in question.

Embodiments herein also relate to a method 200 performed by an MME for network access security control for a UE, the MME and UE operating in a first security domain. Embodiments of such a method will now be described with reference to FIG. 2.

Figure 2:
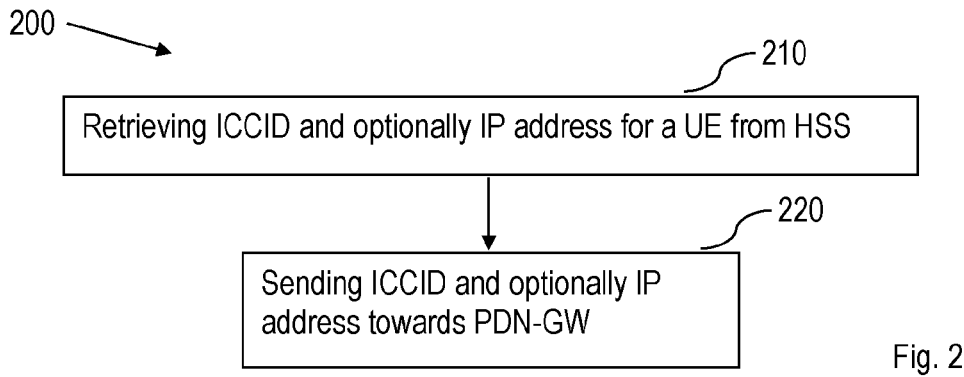
FIG. 2 is a flowchart of a method performed by a Mobility Management Entity, MME, for network access security control for a UE, the MME and UE operating in a first security domain according to an exemplifying embodiment.

FIG. 2 is a flowchart of a method performed by an MME for network access security control for a UE, the MME and UE operating in a first security domain according to an exemplifying embodiment.

FIG. 2 illustrates the method comprising retrieving 210 an ICCID and optionally an Internet Protocol, IP, address for the UE from a Home Subscriber Server, HSS; and sending 220 the ICCID and optionally the IP address towards a PDN-GW.

As described above, the MME is involved in bearer activation/deactivation process and is also responsible for generation and allocation of temporary identities to UEs. The MME also handles security key management. The MME at some previous point in time may have received an attach request or similar from the UE. The MME is responsible for authenticating the user by interacting with the HSS. Thus the MME may retrieve at least the ICCID of the SIM card used by the UE, e.g. by sending the request for the ICCID to the HSS. Optionally, as described above, the MME may attempt to retrieve an IP address for the UE from the HSS. This may be done be sending a request for the ICCID and optionally the IP address to the HSS and receiving a response from the HSS, the response comprising at least the ICCID. Once the MME has retrieved at least the ICCID, the MME sends 220 the ICCID towards the PDN-GW. In case the MME also retrieved the IP address for the UE, the MME may also send the IP address towards the PDN-GW. Typically, the MME is also responsible for choosing a SGW for a UE at an initial attach procedure: Thus, when sending the ICCID and optionally also the IP address towards the PDN-GW, one or more nodes may be present in the path between the MME and the PDN-GW, e.g. the SGW. In other words, the MME may send the ICCID and optionally the IP address to the SGW for further forwarding to the PDN-GW.

The method performed by the MME may have the same advantages as the method performed by the system as a whole. Since the MME is part of the system comprising the MME, the MME enables the possible advantages of the system. Thus, the method performed by the MME may also have the advantage that a solution for identification of traffic source by using a secure association between the actual person who possess the mobile device that is the traffic source and IP address that traffic is originated from may be provided. The method may enable, or contributing to, eliminating the necessity for the overlay security mechanism such as VPN which creates unnecessary transport overhead in the network when no confidentiality and integrity protection is required for the traffic in question.

Embodiments herein also relate to a method performed by a PDN-GW in a first security domain for providing information about an association between an IP address assigned to a UE and an ICCID of a SIM card used by the UE, in the first security domain to an entity in a second security domain. Embodiments of such a method will now be described with reference to FIG. 3.

Figure 3:
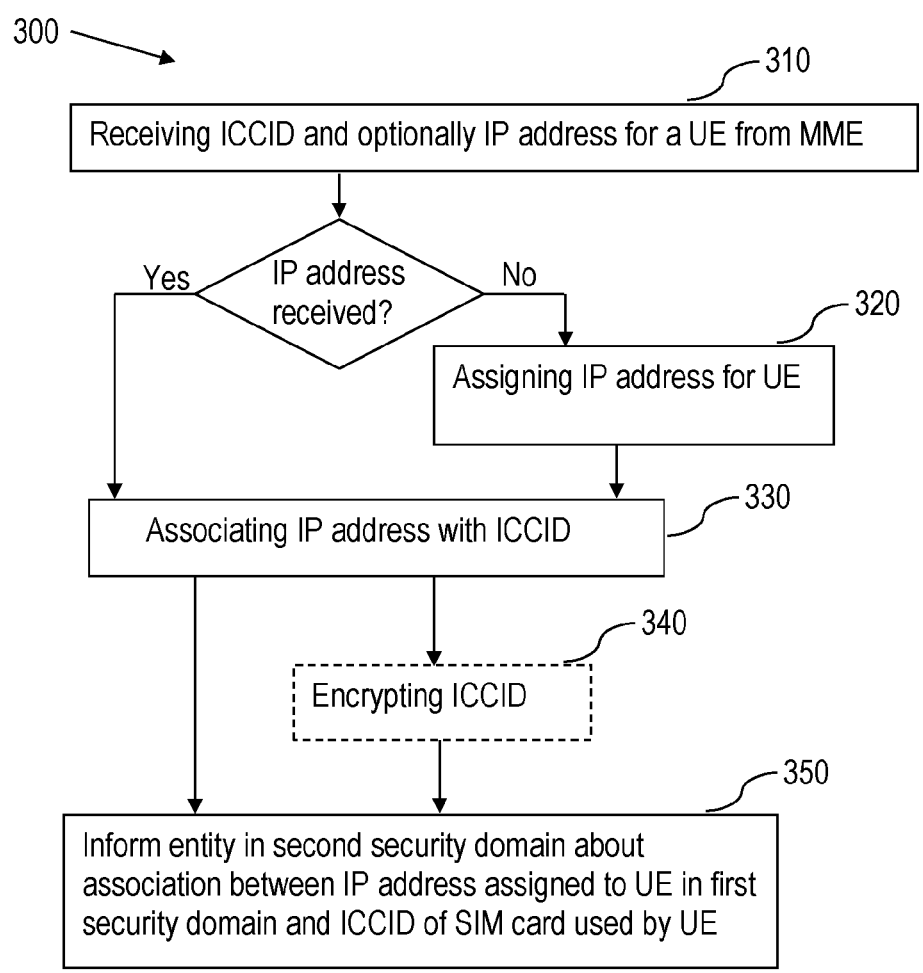
FIG. 3 is a flowchart of a method performed by a PDN-GW in a first security domain for providing information about an association between an IP address assigned to a UE and an ICCID of a SIM card used by the UE, in the first security domain to an entity in a second security domain according to an exemplifying embodiment.

FIG. 3 illustrates the method comprising receiving 310, from a MME, the ICCID and optionally an IP address for the UE. If no IP address for the UE was received, then assigning 320 an IP address for the UE. The method further comprises associating 330 the IP address with the ICCID; and informing 350 the entity in the second security domain about the association between the IP address assigned to the UE and the ICCID of the SIM card used by the UE in the first security domain.

The PDN-GW receives 310, as described above, the ICCID and optionally also the IP address from the MME. The PDN-GW may check if an IP address actually was received, and if not, then the PDN-GW assigns 320 an IP address to the UE. A UE may have a static IP address or the PDN-GW may generate a dynamic IP address. Merely as an example, the PDN-GW may generate an IP address for the UE during establishment of a bearer, e.g. in response to receiving a Create Session Request from the MME, wherein the Create Session Request may comprise the ICCID. Generating and/or assigning an IP address to the UE may be done by requesting the IP address from a Dynamic Host Configuration Protocol, DHCP, server. Once the PDN-GW has assigned the IP address for the UE, or received the IP address for the UE from the MME, the PDN-GW associates 330 the IP address with the ICCID. Then the PDN-GW informs 350 the entity in the second security domain about the association between the IP address assigned to the UE and the ICCID of the SIM card used by the UE in the first security domain. In this manner, the entity in the second security domain may identify the UE by the received ICCID and not the IP address.

The method performed by the PDN-GW may have the same advantages as the method performed by the system as a whole and the PDN-GW. Since the PDN-GW is part of the system comprising the PDN-GW, the PDN-GW enables the possible advantages of the system. Thus, the method performed by the PDN-GW may also have the advantage that a solution for identification of traffic source by using a secure association between the actual person who possess the mobile device that is the traffic source and IP address that traffic is originated from may be provided. The method may enable, or contributing to, eliminating the necessity for the overlay security mechanism such as VPN which creates unnecessary transport overhead in the network when no confidentiality and integrity protection is required for the traffic in question.

The method may further comprise confidentiality protecting the information about ICCID by encrypting 340 the ICCID before informing 350 the entity in the second security domain about the association between the IP address assigned to the UE and the ICCID of the SIM card used by the UE in the first security domain.

The ICCID identifies each SIM internationally. A full ICCID is 19 or 20 characters. The format of the ICCID is: MMCC IINN NNNN NNNN NN C x. MM=Constant (ISO 7812 Major Industry Identifier, =89 for "Telecommunications administrations and private operating agencies"). CC=Country Code (MCC). II=Issuer Identifier (or Network Code MNC). N{12}=Account ID ("SIM number"). C=Checksum calculated from the other 19 digits. x=An extra 20th digit is returned by the 'AT!ICCID?' command.

ICCID MM value is always equal to "89". The MCC and MNC are easy to find out (e.g. for Telia Sweden it is "46 02"). Checksum and AT-byte are irrelevant. This leaves 12 unique digits of ICCID value.

In order to avoid the possibility of unintentional disclosure of ICCID value to unauthorized third party, the ICCID value may be encrypted 340 before be sent to the second security domain. There are many ways to encrypt the ICCID as will be exemplified below. After the ICCID has been encrypted, it may be referred to as a "crypto-ID".

The method may further comprise protecting information exchange between the first and the second security domain by creating a secure connection between the PDN-GW in the first security domain and a GW node in the second security domain.

There are several examples of how to create a secure connection between the PDN-GW in the first security domain and a GW node. One example is by means of IPsec. IPsec is short for IP security and it protects a secure data flow within an unsecured part of a network. IPsec works by authenticating and encrypting each IP packet of a communication session.

Informing 350 the entity in the second security domain about the association between the IP address assigned to the UE and the ICCID of the SIM card may be done by means of a Border Gateway Protocol, BGP.

BGP is a routing protocol that is used to exchange routing information across the Internet. There is presently more than one version of BGP and BGPv4, i.e. version 4 may be especially suitable to use. Using a standard routing protocol for secure propagation of relation between IP address and "crypto-ID" enables automatic provisioning of secure appliances so they could build security policies based on particular identity rather than on abstract IP address. When defining a BGP session between two security domains, it is necessary to agree on "key" and crypto function (e.g. hash) that will be used for cryptographic conversion of ICCID into a "crypto-ID" which can be represented with 40 bits of BGP extended community attribute value field. The unique 12 digits of ICCID are transformed into "crypto-ID" which is propagated across Autonomous System, AS, boundaries using BGP extended community attribute.

A community is a BGP attribute that may be added to each prefix. Communities are transitive optional attributes, meaning BGP implementations do not have to recognise the attribute and at the network operator's discretion carry it through security domain or pass it on to another security domain.

The values 0x00000000 through 0x0000FFFF and 0xFFFF0000 through 0xFFFFFFFF are reserved. Three communities are defined in RFC 1997 and are standard within BGP implementations: NO-EXPORT (0xFFFFFF01), NO-ADVERTISE (0xFFFFFF02), and NO-ADVERTISE-SUBCONFED (0xFFFFFF03).

BGP extended community, RFC 4360, is a transitive-optional attribute. It has an 8-octet value. The first octet specifies the type (and optionally the second value can specify a subtype). This value dictates the structure given to the remaining octets. So, together, the first two octets inform of two things: a) how to partition and read the remaining 6 octets, and b) how to interpret the information in the remaining 6 octets.

The Type field gives the community some immediate flexibility. The first is the use of bit 0 to represent whether the community is registered with the Internet Assigned Numbers Authority (IANA) or if it is specified by the Internet Engineering Task Force (IETF). The second bit gives the Extended Community a coarse scope, either Transitive, meaning it may be passed between ASs, or Non-Transitive, meaning it should be carried only within the local AS.

BGP extended community is used for propagation of different information along the route updates across the autonomous systems. For example, in Multiprotocol label switching, MPLS, it is used to propagate route tags, Differentiated services Code Point, DSCP, values can be propagated with BGP extended communities as well. BGP extended community attribute may be used to propagate the transformed into "crypto-ID" ICCID value to propagate the relation between IP address (L3) and a group security tag (L2).

Embodiments herein also relate to a method performed by a HSS in a first security domain for enabling association between a particular subscriber identity behind a UE and an IP address assigned to the UE, in a first security domain provided to an entity in a second security domain. Embodiments of such a method will now be described with reference to FIG. 4.

Figure 4:
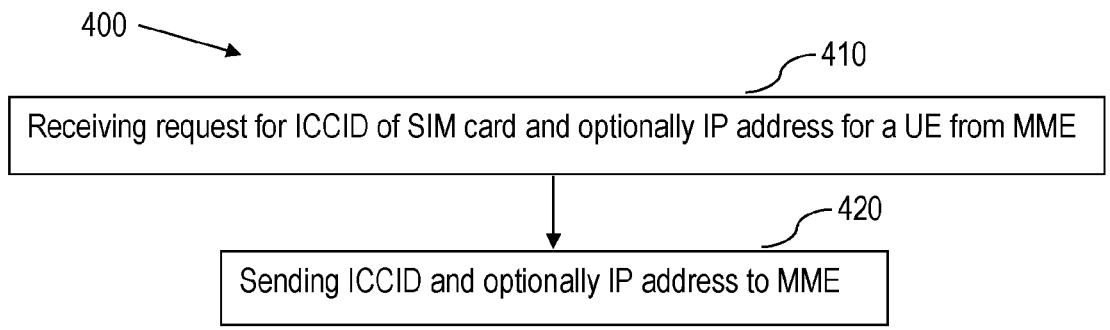
FIG. 4 is a flowchart of a method performed by an HSS in a first security domain for enabling association between a particular subscriber identity behind a UE and an IP address assigned to the UE, in a first security domain provided to an entity in a second security domain according to an exemplifying embodiment.

FIG. 4 illustrates the method comprising receiving 410 a request for an ICCID of a SIM card used in the UE and optionally an IP address for the UE and from a MME; and sending 420 the ICCID and optionally the IP address to the MME.

The HSS is a database that comprises user-related and subscription-related information. The functions of the HSS include functionalities such as mobility management, call and session establishment support, user authentication and access authorisation. The HSS receives 410 the request for an ICCID of a SIM card used in the UE and optionally an IP address for the UE and from a MME. The optional request for the IP address for the UE may be a separate request or incorporated into the request for the ICCID. The HSS finds at least the ICCID as stored and sends 420 the ICCID and optionally the IP address and to the MME.

The method performed by the HSS may have the same advantages as the method performed by the system as a whole. Since the HSS is part of the system comprising the HSS, the HSS enables the possible advantages of the system. Thus, the method performed by the HSS may also have the advantage that a solution for identification of traffic source by using a secure association between the actual person who possess the mobile device that is the traffic source and IP address that traffic is originated from may be provided. The method may enable, or contributing to, eliminating the necessity for the overlay security mechanism such as VPN which creates unnecessary transport overhead in the network when no confidentiality and integrity protection is required for the traffic in question.

Embodiments herein also relate to a system for providing information about an association between an IP address assigned to a UE 1110 and an ICCID of a SIM card used in the UE in a first security domain to an entity in a second security domain. The system comprises a MME 1120, a HSS 1130 and a PDN-GW 1140. The system has the same technical features, objects and advantages as the method performed by the system as described above. Hence, the system will only be described in brief in order to avoid unnecessary repetition.

Looking again at FIG. 1, FIG. 1 illustrates the system comprising the a MME 1120, the HSS 1130 and the PDN-GW 1140, wherein the MME 1120 is adapted for retrieving at least the ICCID of the SIM card used by the UE and optionally an IP address for the UE from the HSS 1130, and for sending the ICCID and optionally the IP address towards the PDN-GW 1140. Further, the HSS 1130 is adapted for receiving a request for the ICCID and optionally for the IP address from the MME, and for sending the ICC ID and optionally the IP address to the MME. Still further, the PDN-GW 1140 is adapted for receiving the ICCID for the SIM card used by UE and optionally the IP address for the UE, if no IP address is received then the PDN-GW is adapted for assigning an IP address for the UE, associating the assigned IP address with the ICCID and informing the entity in the second security domain about the association between the IP address assigned to the UE and ICCID of the SIM card used by the UE in the first security domain.

The system has the same possible advantages as the method performed by the system. One possible advantage is that a solution for identification of traffic source by using a secure association between the actual person who possess the mobile device that is the traffic source and IP address that traffic is originated from may be provided. The method may eliminate the necessity for the overlay security mechanism such as VPN which creates unnecessary transport overhead in the network when no confidentiality and integrity protection is required for the traffic in question.

Embodiments herein also relate to a MME adapted for network access security control for a UE, the MME and UE operating in a first security domain. The MME has the same technical features, objects and advantages as the method performed by the MME as described above. Hence, the MME will only be described in brief, with reference to FIG. 5, in order to avoid unnecessary repetition.

Figure 5:
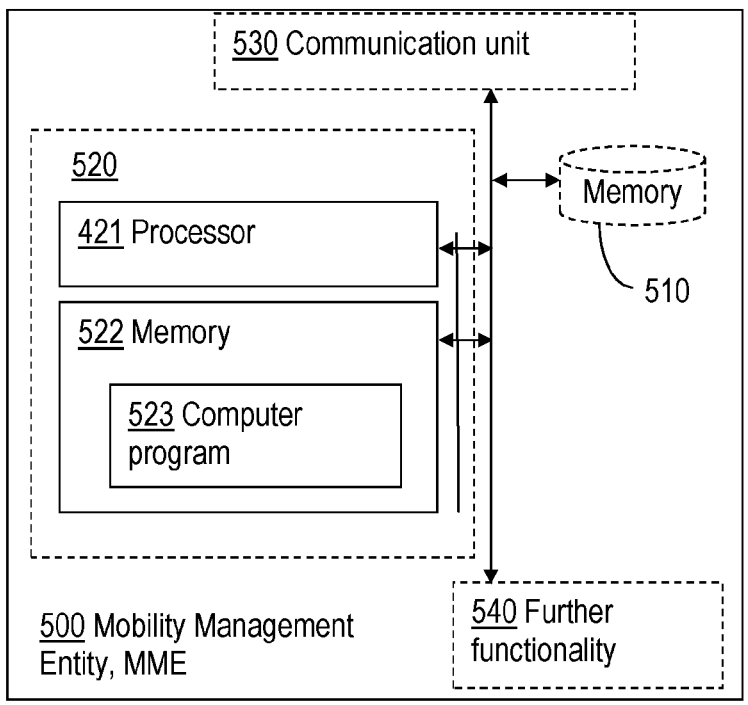
FIG. 5 is a block diagram of a MME adapted for network access security control for a UE, the MME and UE operating in a first security domain according to an exemplifying embodiment.

FIG. 5 illustrates the MME 500 comprising a processor 521 and a memory 522, the memory comprising instructions which when executed by the processor causes the MME 500 to retrieve an ICCID and optionally an IP address for the UE from a HSS; and to send the ICCID and optionally the IP address towards a PDN-GW.

The MME has the same possible advantages as the method performed by the MME. Since the MME is part of the system comprising the MME, the MME enables the possible advantages of the system. Thus, the method performed by the MME may also have the advantage that a solution for identification of traffic source by using a secure association between the actual person who possess the mobile device that is the traffic source and IP address that traffic is originated from may be provided. The method may enable, or contributing to, eliminating the necessity for the overlay security mechanism such as VPN which creates unnecessary transport overhead in the network when no confidentiality and integrity protection is required for the traffic in question.

Embodiments herein also relate to a PDN-GW in a first security domain adapted for providing information about an association between an IP address assigned to a UE and an ICCID of a SIM card used by the UE, in the first security domain to an entity in a second security domain. The PDN-GW has the same technical features, objects and advantages as the method performed by the PDN-GW as described above. Hence, the PDN-GW will only be described in brief, with reference to FIG. 6, in order to avoid unnecessary repetition.

Figure 6:
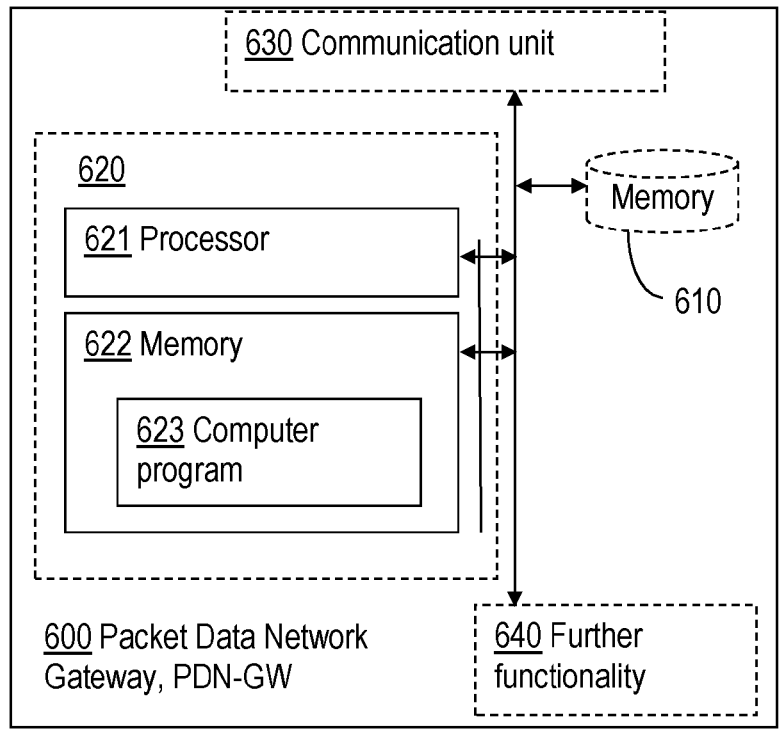
FIG. 6 is a block diagram of a PDN-GW in a first security domain adapted for providing information about an association between an IP address assigned to a UE and an ICCID of a SIM card used by the UE, in the first security domain to an entity in a second security domain according to an exemplifying embodiment.

FIG. 6 illustrates the PDN-GW 600 comprising a processor 621 and a memory 622, the memory comprising instructions which when executed by the processor causes the PDN-GW 600 to receive, from a MME, the ICCID and optionally an IP address for the UE; and if no IP address for the UE was received, then to assign an IP address for the UE. The instructions in the memory 622 when executed by the processor further causes the PDN-GW 600 to associate the IP address to the ICCID; and to inform the entity in the second security domain about the association between the IP address assigned to the UE and the ICCID of the SIM card used by the UE in the first security domain.

The PDN-GW has the same possible advantages as the method performed by the PDN-GW. Since the PDN-GW is part of the system comprising the PDN-GW, the PDN-GW enables the possible advantages of the system. Thus, the method performed by the PDN-GW may also have the advantage that a solution for identification of traffic source by using a secure association between the actual person who possess the mobile device that is the traffic source and IP address that traffic is originated from may be provided. The method may enable, or contributing to, eliminating the necessity for the overlay security mechanism such as VPN which creates unnecessary transport overhead in the network when no confidentiality and integrity protection is required for the traffic in question.

The memory 622 may further comprise instructions which when executed by the processor 621 causes the PDN-GW 600 to confidentiality protect the information about ICCID by encrypting the ICCID before informing the entity in the second security domain about the association between the IP address assigned to the UE and the ICCID of the SIM card used by the UE in the first security domain.

The memory 622 may still further comprise instructions which when executed by the processor 621 causes the PDN-GW 600 to protect information exchange between the first and the second security domain by creating a secure connection between the PDN-GW in the first security domain and a gateway node in the second security domain.

According to an embodiment, informing the entity in the second security domain about the association between the IP address assigned to the UE and the ICCID of the SIM card is done by means of a Border Gateway Protocol.

Embodiments herein also relate to a HSS in a first security domain adapted for enabling association between a particular subscriber identity behind a UE and an IP address assigned to the UE, in a first security domain provided to an entity in a second security domain. The HSS has the same technical features, objects and advantages as the method performed by the HSS as described above. Hence, the HSS will only be described in brief, with reference to FIG. 7, in order to avoid unnecessary repetition.

Figure 7:
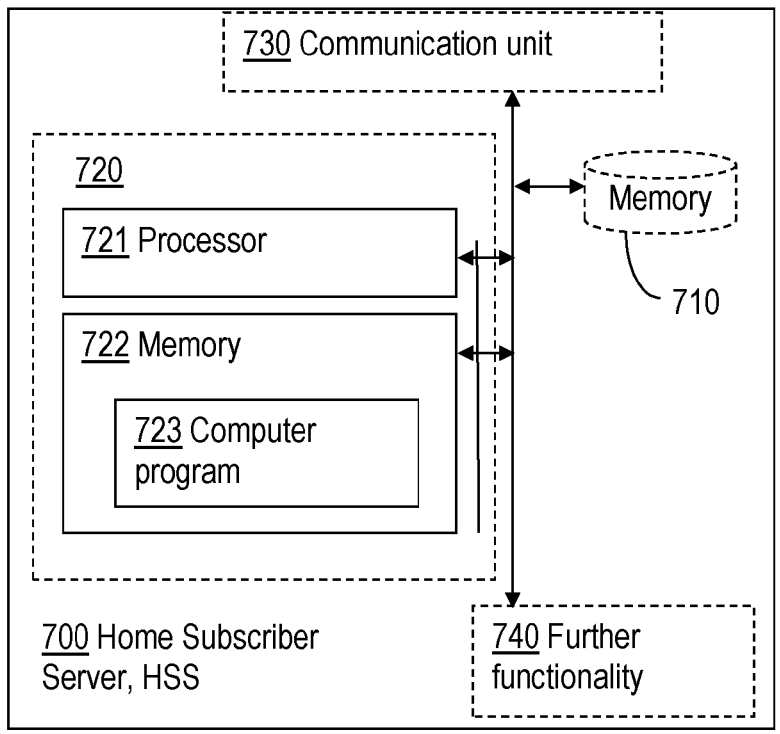
FIG. 7 is a block diagram of an HSS in a first security domain adapted for enabling association between a particular subscriber identity behind a UE and an IP address assigned to the UE, in a first security domain provided to an entity in a second security domain according to an exemplifying embodiment.

FIG. 7 illustrates the HSS 700 comprising a processor 721 and a memory 722, the memory comprising instructions which when executed by the processor causes the HSS 700 to receive a request for an ICCID and optionally an IP address and from a MME; and to send the ICCID and optionally the IP address to the MME.

The HSS has the same possible advantages as the method performed by the HSS. Since the HSS is part of the system comprising the HSS, the HSS enables the possible advantages of the system. Thus, the method performed by the HSS may also have the advantage that a solution for identification of traffic source by using a secure association between the actual person who possess the mobile device that is the traffic source and IP address that traffic is originated from may be provided. The method may enable, or contributing to, eliminating the necessity for the overlay security mechanism such as VPN which creates unnecessary transport overhead in the network when no confidentiality and integrity protection is required for the traffic in question.

Embodiments herein also relate to a MME for network access security control for a UE, the MME and UE operating in a first security domain. The MME has the same technical features, objects and advantages as the method performed by the MME, and the MME described with reference to FIG. 5 as described above. Hence, the MME will only be described in brief, with reference to FIG. 8, in order to avoid unnecessary repetition.

Figure 8:
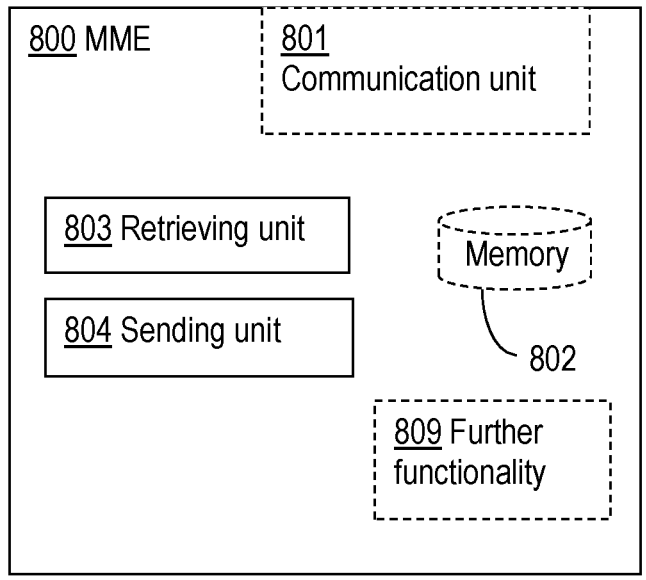
FIG. 8 is a block diagram of a MME for network access security control for a UE, the MME and UE operating in a first security domain according to an exemplifying embodiment.

FIG. 8 illustrates the MME 800 comprising a retrieving unit 803 for retrieving an ICCID and optionally an IP address for the UE from a HSS; and a sending unit 804 for sending the ICCID and optionally the IP address towards a PDN-GW.

In FIG. 8, the MME 800 is also illustrated comprising a communication unit 801. Through this unit, the MME 800 is adapted to communicate with other nodes and/or entities in the first and/or the second security domain. The communication unit 801 may comprise more than one receiving arrangement. For example, the receiving unit may be connected to both a wire and an antenna, by means of which the MME 800 is enabled to communicate with other nodes and/or entities in the first and/or the second security domain. The MME 800 further comprises a memory 802 for storing data. Further, the MME 800 comprises a control or processing unit (not shown) which in turn may be connected to the different units 803-804. It shall be pointed out that this is merely an illustrative example and the MME 800 may comprise more, less or other units or modules which execute the functions of the MME 800 in the same manner as the units illustrated in FIG. 8.

It should be noted that FIG. 8 merely illustrates various functional units in the MME 800 in a logical sense. The functions in practice may be implemented using any suitable software and hardware means/circuits etc. Thus, the embodiments are generally not limited to the shown structures of the MME 800 and the functional units. Hence, the previously described exemplary embodiments may be realised in many ways. For example, one embodiment includes a computer-readable medium having instructions stored thereon that are executable by the control or processing unit for executing the method steps in the MME 800. The instructions executable by the computing system and stored on the computer-readable medium perform the method steps of the MME 800 as set forth in the claims.

The MME has the same possible advantages as the method performed by the MME and the MME described with reference to FIG. 5 as described above. Since the MME is part of the system comprising the MME, the MME enables the possible advantages of the system. Thus, the method performed by the MME may also have the advantage that a solution for identification of traffic source by using a secure association between the actual person who possess the mobile device that is the traffic source and IP address that traffic is originated from may be provided. The method may enable, or contributing to, eliminating the necessity for the overlay security mechanism such as VPN which creates unnecessary transport overhead in the network when no confidentiality and integrity protection is required for the traffic in question.

Embodiments herein also relate to a PDN-GW in a first security domain for providing information about an association between an IP address assigned to a UE and an ICCID of a SIM card used by the UE, in the first security domain to an entity in a second security domain. The PDN-GW has the same technical features, objects and advantages as the method performed by the PDN-GW as described above and the PDN-GW described above with reference to FIG. 6. Hence, the PDN-GW will only be described in brief, with reference to FIG. 9, in order to avoid unnecessary repetition.

Figure 9:
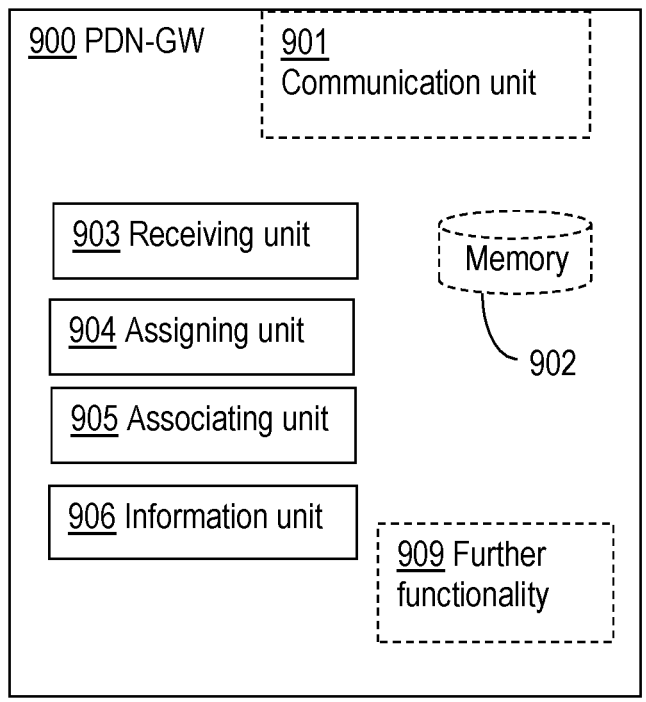
FIG. 9 is a block diagram of a PDN-GW in a first security domain for providing information about an association between an IP address assigned to a UE and an ICCID of a SIM card used by the UE, in the first security domain to an entity in a second security domain according to an exemplifying embodiment.

FIG. 9 illustrates the PDN-GW 900 comprising a receiving unit 903 for receiving, from a MME, the ICCID and optionally an IP address for the UE; and an assigning unit 904 for assigning an IP address for the UE if no IP address for the UE was received. The PDN-GW 900 further comprises an associating unit 905 for associating the IP address to the ICCID; and an informing unit 906 for informing the entity in the second security domain about the association between the IP address assigned to the UE and the ICCID of the SIM card used by the UE in the first security domain.

In FIG. 9, the PDN-GW 900 is also illustrated comprising a communication unit 901. Through this unit, the PDN-GW 900 is adapted to communicate with other nodes and/or entities in the first and/or the second security domain. The communication unit 901 may comprise more than one receiving arrangement. For example, the receiving unit may be connected to both a wire and an antenna, by means of which the PDN-GW 900 is enabled to communicate with other nodes and/or entities in the first and/or the second security domain. The PDN-GW 900 further comprises a memory 902 for storing data. Further, the PDN-GW 900 comprises a control or processing unit (not shown) which in turn may be connected to the different units 903-906. It shall be pointed out that this is merely an illustrative example and the PDN-GW 900 may comprise more, less or other units or modules which execute the functions of the PDN-GW 900 in the same manner as the units illustrated in FIG. 9.

It should be noted that FIG. 9 merely illustrates various functional units in the PDN-GW 900 in a logical sense. The functions in practice may be implemented using any suitable software and hardware means/circuits etc. Thus, the embodiments are generally not limited to the shown structures of the PDN-GW 900 and the functional units. Hence, the previously described exemplary embodiments may be realised in many ways. For example, one embodiment includes a computer-readable medium having instructions stored thereon that are executable by the control or processing unit for executing the method steps in the PDN-GW 900. The instructions executable by the computing system and stored on the computer-readable medium perform the method steps of the PDN-GW 900 as set forth in the claims.

The PDN-GW has the same possible advantages as the method performed by the PDN-GW and the PDN-GW described above with reference to FIG. 6. Since the PDN-GW is part of the system comprising the PDN-GW, the PDN-GW enables the possible advantages of the system. Thus, the method performed by the PDN-GW may also have the advantage that a solution for identification of traffic source by using a secure association between the actual person who possess the mobile device that is the traffic source and IP address that traffic is originated from may be provided. The method may enable, or contributing to, eliminating the necessity for the overlay security mechanism such as VPN which creates unnecessary transport overhead in the network when no confidentiality and integrity protection is required for the traffic in question.

Embodiments herein also relate to a HSS in a first security domain for enabling association between a particular subscriber identity behind a UE and an IP address assigned to the UE, in a first security domain provided to an entity in a second security domain. The HSS has the same technical features, objects and advantages as the method performed by the HSS as described above and the HSS as described above with reference to FIG. 7. Hence, the HSS will only be described in brief, with reference to FIG. 10, in order to avoid unnecessary repetition.

Figure 10:
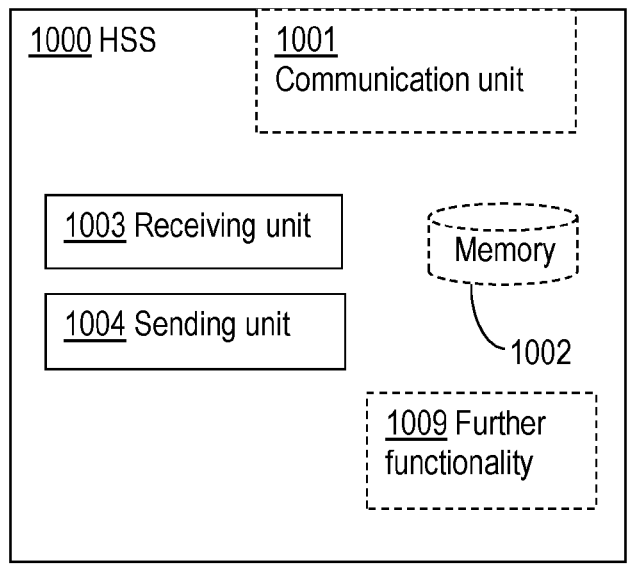
FIG. 10 is a block diagram of an HSS in a first security domain for enabling association between a particular subscriber identity behind a UE and an IP address assigned to the UE, in a first security domain provided to an entity in a second security domain according to an exemplifying embodiment.

FIG. 10 illustrates the HSS 1000 comprising a receiving unit 1003 for receiving a request for an ICCID and optionally an IP address and from a MME; and a sending unit 1004 for sending the ICCID and optionally the IP address and to the MME.

The HSS has the same possible advantages as the method performed by the HSS and the HSS described above with reference to FIG. 7. Since the HSS is part of the system comprising the HSS, the HSS enables the possible advantages of the system. Thus, the method performed by the HSS may also have the advantage that a solution for identification of traffic source by using a secure association between the actual person who possess the mobile device that is the traffic source and IP address that traffic is originated from may be provided. The method may enable, or contributing to, eliminating the necessity for the overlay security mechanism such as VPN which creates unnecessary transport overhead in the network when no confidentiality and integrity protection is required for the traffic in question.

In FIG. 10, the HSS 1000 is also illustrated comprising a communication unit 1001. Through this unit, the HSS 1000 is adapted to communicate with other nodes and/or entities in the first security domain. The communication unit 1001 may comprise more than one receiving arrangement. For example, the receiving unit may be connected to both a wire and an antenna, by means of which the HSS 1000 is enabled to communicate with other nodes and/or entities in the first security domain. The HSS 1000 further comprises a memory 1002 for storing data. Further, the HSS 1000 comprises a control or processing unit (not shown) which in turn may be connected to the different units 1003-1004. It shall be pointed out that this is merely an illustrative example and the HSS 1000 may comprise more, less or other units or modules which execute the functions of the HSS 1000 in the same manner as the units illustrated in FIG. 10.

It should be noted that FIG. 10 merely illustrates various functional units in the HSS 1000 in a logical sense. The functions in practice may be implemented using any suitable software and hardware means/circuits etc. Thus, the embodiments are generally not limited to the shown structures of the HSS 1000 and the functional units. Hence, the previously described exemplary embodiments may be realised in many ways. For example, one embodiment includes a computer-readable medium having instructions stored thereon that are executable by the control or processing unit for executing the method steps in the HSS 1000. The instructions executable by the computing system and stored on the computer-readable medium perform the method steps of the HSS 1000 as set forth in the claims.

Figure 11:
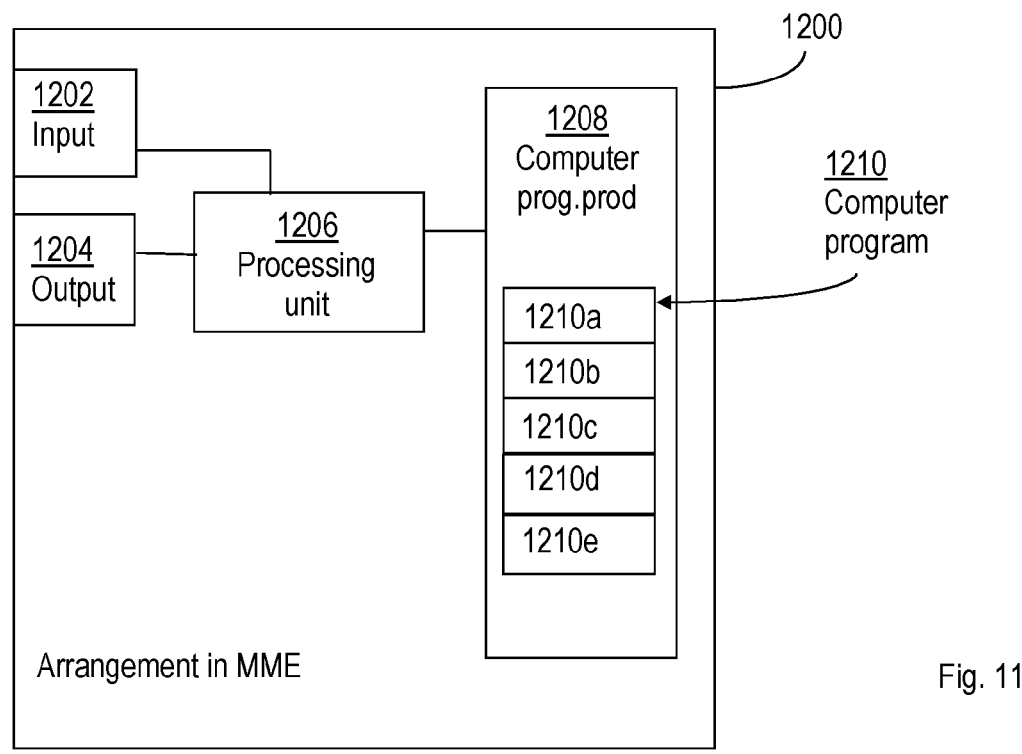
FIG. 11 is a block diagram of an arrangement in a MME adapted for network access security control for a UE, the MME and UE operating in a first security domain according to an exemplifying embodiment.

FIG. 11 schematically shows an embodiment of an arrangement in a MME 1200. Comprised in the MME 1200 are here a processing unit 1206, e.g. with a DSP (Digital Signal Processor). The processing unit 1206 may be a single unit or a plurality of units to perform different actions of procedures described herein. The MME 1200 may also comprise an input unit 1202 for receiving signals from other entities, and an output unit 1204 for providing signal(s) to other entities. The input unit and the output unit may be arranged as an integrated entity or as illustrated in the example of FIG. 8, as one or more interfaces 801.

Furthermore, the MME 1200 comprises at least one computer program product 1208 in the form of a non-volatile memory, e.g. an EEPROM (Electrically Erasable Programmable Read-Only Memory), a flash memory and a hard drive. The computer program product 1208 comprises a computer program 1210, which comprises code means, which when executed in the processing unit 1206 in the MME 1200 causes the MME 1200 to perform the actions e.g. of the procedure described earlier in conjunction with FIG. 2.

The computer program 1210 may be configured as a computer program code structured in computer program modules 1210a-1210e. Hence, in an exemplifying embodiment, the code means in the computer program of the MME 1200 comprises a retrieving unit, or module, for retrieving an ICCID and optionally and IP address for the UE from a HSS. The computer program further comprises a sending unit, or module, for sending the ICCID and optionally the IP address towards a PDN-GW.

The computer program modules could essentially perform the actions of the flow illustrated in FIG. 2, to emulate the MME 800. In other words, when the different computer program modules are executed in the processing unit 1206, they may correspond to the units 803-804 of FIG. 8.

Figure 12:
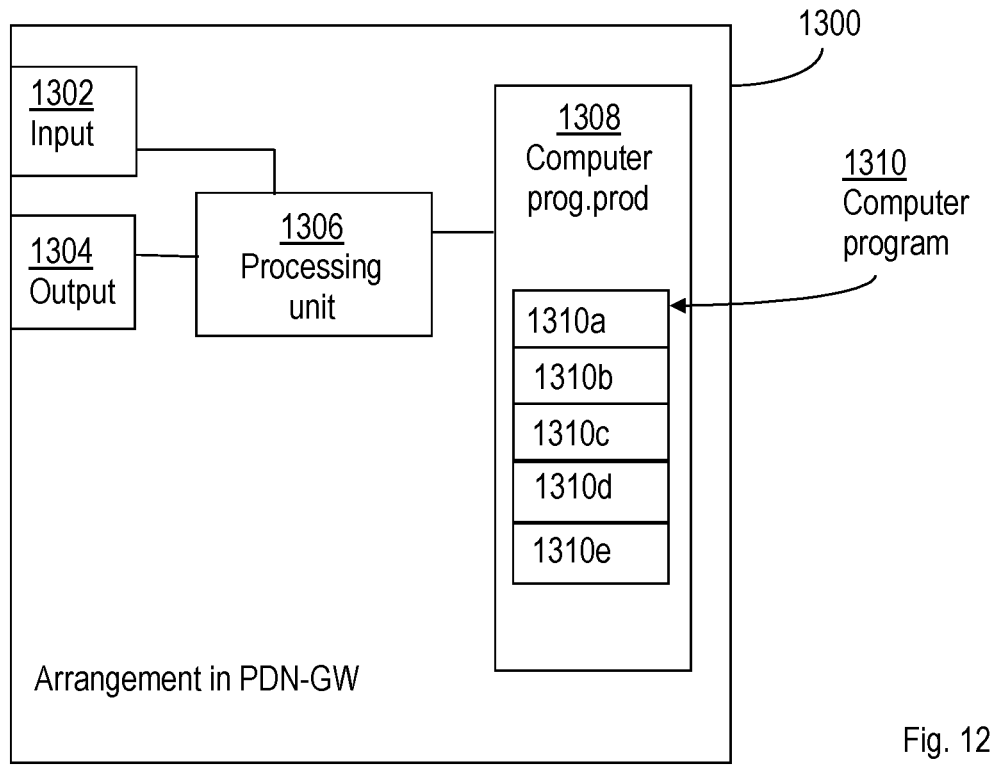
FIG. 12 is a block diagram of an arrangement in a PDN-GW in a first security domain adapted for providing information about an association between an IP address assigned to a UE and an ICCID of a SIM card used by the UE, in the first security domain to an entity in a second security domain according to an exemplifying embodiment.

FIG. 12 schematically shows an embodiment of an arrangement in a PDN-GW 1300. Comprised in the PDN-GW 1300 are here a processing unit 1306, e.g. with a DSP (Digital Signal Processor). The processing unit 1306 may be a single unit or a plurality of units to perform different actions of procedures described herein. The PDN-GW 1300 may also comprise an input unit 1302 for receiving signals from other entities, and an output unit 1304 for providing signal(s) to other entities. The input unit and the output unit may be arranged as an integrated entity or as illustrated in the example of FIG. 9, as one or more interfaces 901.

Furthermore, the PDN-GW 1300 comprises at least one computer program product 1308 in the form of a non-volatile memory, e.g. an EEPROM (Electrically Erasable Programmable Read-Only Memory), a flash memory and a hard drive. The computer program product 1308 comprises a computer program 1310, which comprises code means, which when executed in the processing unit 1306 in the PDN-GW 1300 causes the PDN-GW 1300 to perform the actions e.g. of the procedure described earlier in conjunction with FIG. 3.

The computer program 1310 may be configured as a computer program code structured in computer program modules 1310a-1310e. Hence, in an exemplifying embodiment, the code means in the computer program of the PDN-GW 1300 comprises a receiving unit, or module, for receiving, from a MME, the ICCID and optionally an IP address for the UE. The computer program may further comprise an assigning unit, or module, for assigning an IP address for the UE if no IP address for the UE was received. Further, the computer program comprises an associating unit, or module, for receiving associating the IP address with the ICCID and an informing unit, or module, for informing the entity in the second security domain about the association between the IP address assigned to the UE and the ICCID of the SIM card used by the UE in the first security domain.

The computer program modules could essentially perform the actions of the flow illustrated in FIG. 3, to emulate the PDN-GW 900. In other words, when the different computer program modules are executed in the processing unit 1306, they may correspond to the units 903-906 of FIG. 9.

Figure 13:
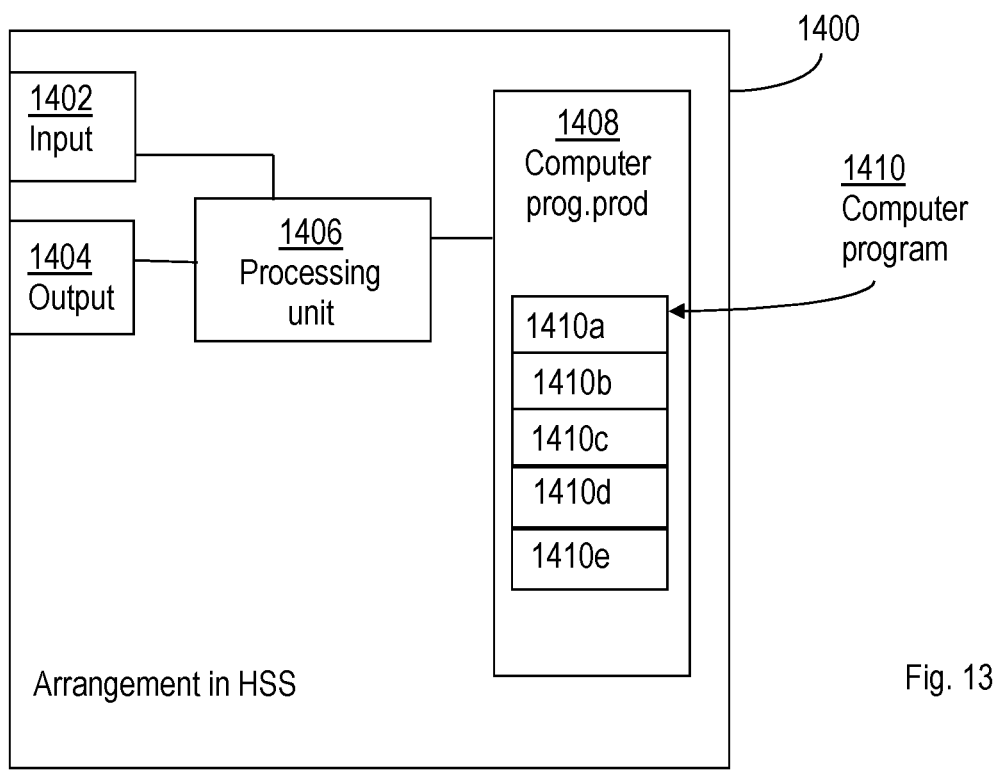
FIG. 13 is a block diagram of an arrangement in an HSS in a first security domain adapted for enabling association between a particular subscriber identity behind a UE and an IP address assigned to the UE, in a first security domain provided to an entity in a second security domain according to an exemplifying embodiment.

FIG. 13 schematically shows an embodiment of an arrangement in a HSS 1400. Comprised in the HSS 1400 are here a processing unit 1406, e.g. with a DSP (Digital Signal Processor). The processing unit 1406 may be a single unit or a plurality of units to perform different actions of procedures described herein. The HSS 1400 may also comprise an input unit 14302 for receiving signals from other entities, and an output unit 1404 for providing signal(s) to other entities. The input unit and the output unit may be arranged as an integrated entity or as illustrated in the example of FIG. 10, as one or more interfaces 1001.

Furthermore, the HSS 1400 comprises at least one computer program product 1408 in the form of a non-volatile memory, e.g. an EEPROM (Electrically Erasable Programmable Read-Only Memory), a flash memory and a hard drive. The computer program product 1408 comprises a computer program 1410, which comprises code means, which when executed in the processing unit 1406 in the HSS 1400 causes the HSS 1400 to perform the actions e.g. of the procedure described earlier in conjunction with FIG. 4.

The computer program 1410 may be configured as a computer program code structured in computer program modules 1410a-1410e. Hence, in an exemplifying embodiment, the code means in the computer program of the HSS 1400 comprises a receiving unit, or module, for receiving a request for an ICCID of a SIM card used in the UE and optionally an IP address for the UE from a MME. Further, the computer program comprises an sending unit, or module, for sending the ICCID and optionally the IP address to the MME.

The computer program modules could essentially perform the actions of the flow illustrated in FIG. 4, to emulate the HSS 1400. In other words, when the different computer program modules are executed in the processing unit 1406, they may correspond to the units 1003-1004 of FIG. 10.

Although the code means in the respective embodiments disclosed above in conjunction with FIGS. 8, 9 and 10 may be implemented as computer program modules which when executed in the respective processing unit causes the MME, the PDN-GW and the HSS respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the MME, the PDN-GW and the HSS respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a system for providing information about an association between an IP address assigned to a User Equipment (UE) and an Integrated Circuit Card Identifier (ICCID) of a Subscriber Identity Module (SIM) card used in the UE in a first security domain to an entity in a second security domain, the system comprising a Mobility Management Entity (MME), a Home Subscriber Server (HSS), and a Packet Data Network Gateway (PDN-GW), the method comprising:
   the MME retrieving at least the ICCID of the SIM card used by the UE and optionally an Internet Protocol (IP) address for the UE from the HSS, and sending the ICCID and, when retrieved, the IP address towards the PDN-GW;
   the HSS receiving a request for the ICCID and optionally for the IP address from the MME, and sending the ICCID and, when requested, the IP address to the MME; and
   the PDN-GW receiving the ICCID for the SIM card used by UE and optionally the IP address for the UE, and when no IP address is received then the PDN-GW assigning an IP address for the UE, associating the IP address with the ICCID and informing the entity in the second security domain about the association between the IP address assigned to the UE and ICCID of the SIM card used by the UE in the first security domain.

2. A method performed by a Packet Data Network Gateway (PDN-GW) in a first security domain for providing information about an association between an IP address assigned to a User Equipment (UE) and an Integrated Circuit Card Identifier (ICCID) of a Subscriber Identity Module (SIM) card used by the UE, in the first security domain to an entity in a second security domain, the method comprising:
   receiving, from a Mobility Management Entity (MME) the ICCID and optionally an Internet Protocol (IP) address for the UE;
   when no IP address for the UE was received, then assigning an IP address for the UE;
   associating the IP address with the ICCID; and
   informing the entity in the second security domain about the association between the IP address assigned to the UE and the ICCID of the SIM card used by the UE in the first security domain.

3. The method according to claim 2, further comprising confidentiality protecting the information about ICCID by encrypting the ICCID before informing the entity in the second security domain about the association between the IP address assigned to the UE and the ICCID of the SIM card used by the UE in the first security domain.

4. The method according to claim 2, further comprises protecting information exchange between the first and the second security domain by creating a secure connection between the PDN-GW in the first security domain and a GW node in the second security domain.

5. The method according to claim 2, wherein informing the entity in the second security domain about the association between the IP address assigned to the UE and the ICCID of the SIM card is done by means of a Border Gateway Protocol.

6. A system for providing information about an association between an IP address assigned to a User Equipment (UE) and an Integrated Circuit Card Identifier (ICCID) of a Subscriber Identity Module (SIM) card used in the UE in a first security domain to an entity in a second security domain, the system comprising a Mobility Management Entity (MME), a Home Subscriber Server (HSS) and a Packet Data Network Gateway (PDN-GW), wherein:
   the MME is adapted for retrieving at least the ICCID of the SIM card used by the UE and optionally an Internet Protocol (IP) address for the UE from the HSS, and for sending the ICCID and, when retrieved, the IP address towards the PDN-GW;
   the HSS is adapted for receiving a request for the ICCID and optionally for the IP address from the MME, and for sending the ICCID and, when requested, the IP address to the MME; and
   the PDN-GW is adapted for receiving the ICCID for the SIM card used by UE and optionally the IP address for the UE, when no IP address is received then the PDN-GW is adapted for assigning an IP address for the UE, associating the IP address with the ICCID and informing the entity in the second security domain about the association between the IP address assigned to the UE and ICCID of the SIM card used by the UE in the first security domain.

7. A Packet Data Network Gateway (PDN-GW) in a first security domain adapted for providing information about an association between an IP address assigned to a User Equipment (UE) and an Integrated Circuit Card Identifier (ICCID) of a Subscriber Identity Module (SIM) card used by the UE, in the first security domain to an entity in a second security domain, the PDN-GW comprising a processor and a memory, the memory comprising instructions which when executed by the processor causes the PDN-GW to:
   receive, from a Mobility Management Entity (MME) the ICCID and optionally an Internet Protocol (IP) address for the UE;
   when no IP address for the UE was received, then to assign an IP address for the UE;
   associate the IP address to the ICCID; and
   inform the entity in the second security domain about the association between the IP address assigned to the UE and the ICCID of the SIM card used by the UE in the first security domain.

8. The PDN-GW according to claim 7, wherein the memory further comprises instructions which when executed by the processor causes the PDN-GW to confidentiality protect the information about ICCID by encrypting the ICCID before informing the entity in the second security domain about the association between the IP address assigned to the UE and the ICCID of the SIM card used by the UE in the first security domain.

9. The PDN-GW according to claim 7, wherein the memory further comprises instructions which when executed by the processor causes the PDN-GW to protect information exchange between the first and the second security domain by creating a secure connection between the PDN-GW in the first security domain and a gateway node in the second security domain.

10. The PDN-GW according to claim 7, wherein informing the entity in the second security domain about the association between the IP address assigned to the UE and the ICCID of the SIM card is done by means of a Border Gateway Protocol.

* * * * *